US005261279A

United States Patent [19]

Wolf et al.

[11] Patent Number: 5,261,279

[45] Date of Patent: Nov. 16, 1993

[54] INCLINATION SENSOR

[75] Inventors: Joerg Wolf, Karlsruhe; Erich Zabler, Stutensee, both of Fed. Rep. of Germany

[73] Assignee: Robert Bosch GmbH, Stuttgart, Fed. Rep. of Germany

[21] Appl. No.: 840,328

[22] Filed: Feb. 24, 1992

[30] Foreign Application Priority Data

Mar. 5, 1991 [DE] Fed. Rep. of Germany ....... 4106932

[51] Int. Cl.[5] .............................................. G01C 9/12

[52] U.S. Cl. ................................... 73/517 R; 33/366; 33/391

[58] Field of Search ............... 73/505, 517 R; 33/308, 33/309, 346, 391, 366; 361/280

[56] References Cited

U.S. PATENT DOCUMENTS

| | | | |
|---|---|---|---|
| 3,372,386 | 3/1968 | Klinger | 73/517 R |
| 4,094,073 | 6/1978 | Parra | 33/366 |
| 4,159,577 | 7/1979 | Bergkvist | 73/517 R |
| 4,831,879 | 5/1989 | Condne et al. | 73/516 R |

OTHER PUBLICATIONS

Yu-Chong Tai and Richard S. Muller, "IC-Processed Electrostatic Synchronous Micromotors", 20 (1989), pp. 49 to 55.

W. Ehrfeld, "The LIGA Process for Microsystems" in *Micro System Technologies 90* edited by Herbert Reichl, 1990, Springer-Verlag Berlin, New York, pp. 520-537.

*Primary Examiner*—Hezron E. Williams
*Assistant Examiner*—Michael Brock
*Attorney, Agent, or Firm*—Frishauf, Holtz, Goodman & Woodward

[57] ABSTRACT

A rotor for detecting inclination angles in relation to a defined rotational axis perpendicular to the direction of the field of gravity is proposed. In the center area of the sensor interior, enclosed by a housing, a mounting (25) is located, which is fixed in relation to the housing (30), and on which a seismic mass is suspended so that it can swing. The seismic mass is formed in the shape of a rotor (10) which is asymmetrical in respect to the mounting (25) and which can perform excursions around an axis defined by the mounting (25). Portions (11, 12) of the rotor (10) constitute electrodes of a capacitor arrangement. A border (20), fixed in relation to the housing (30), is disposed around the rotor (10) parallel to the axis defined by the mounting (25). The portions (21, 22, 23) of the border (20) constitute the backplate electrodes of the capacitor arrangement.

12 Claims, 2 Drawing Sheets

30
CK
20
23
11
10
13
25
-31-
12
21
22
C1
C2

INCLINATION SENSOR

CROSS-REFERENCE TO RELATED PATENT AND APPLICATION, THE DISCLOSURES OF WHICH ARE HEREBY INCORPORATED BY REFERENCE

U.S. Pat. No. 4,831,879, CONDNE & MATTES/-BOSCH, May 23, 1989, corresponding to German Disclosure DE-OS 36 04 216; U.S. Ser. No. 07/ 724,142, ABENDROTH, now U.S. Pat. No. 5,153,394 corresponding to DE 40 21 056.1.

FIELD OF THE INVENTION

The invention relates to a sensor for detecting inclination angles in relation to a defined rotational axis perpendicular to the direction of the field of gravity.

BACKGROUND

A sensor for the automatic triggering of protective devices for occupants in case of an accident is described in U.S. Pat. No. 4,831,879, CONDNE & MATTES, and corresponding German Patent Application DE-OS 36 04 216. A pendulum with a seismic mass is fastened on a retainer or in a bearing in the center of the interior of the sensor housing The interior chamber is completely filled with a damping fluid. The shape of the interior and the components of the pendulum and of the damping medium have been selected such that the damping medium around the pendulum remains practically completely at rest in the course of rotation of the housing around the attachment point of the pendulum and that friction as a result of the movement of the pendulum in respect to the damping medium results in aperiodic damping of the pendulum.

Electrostatically operated motors, having a rotor seated on a wheel hub and stators arranged in a circle around the rotor, are known from an article by Yu-Chong Tai and Richard S. Muller, entitled "IC-Processed Electrostatic Synchronous Micromotors", published in Sensors and Actuators, 20 (1989), pp. 49 to 55. Methods for the production of such motors in accordance with surface micromechanical techniques, in particular as surface polysilicon structures, are described in this publication.

A microturbine and its production in accordance with Liga [Lithografie, Galvanoformung, Abformung—lithography, electroforming, casting from another cast] technology has been described in an article entitled "Bewegliche Mikrostructuren" [Movable Microstructures] in etz, Vol. 111 (1990), Issue No. 20, p. 1080.

THE INVENTION

The inclination sensor in accordance with the invention has the advantage that it can be produced micromechanically, for example by means of surface polysilicon structures, or by means of metal or plastic structures produced in accordance with Liga technology. The micromechanical technology allows cost-efficient mass production of the inclination sensor of the invention having a very small size. Particularly advantageous is the embodiment of the sensor pendulum in the form of an asymmetrical rotor, the axis of rotation of which is oriented parallel to the axis of interest, because its mode of operation corresponds to that of a low tuned pendulum and is well suited for suppressing disturbing accelerations. A further advantage of the sensor of the invention lies in that inclinations in the field of gravity, by means of which the rotor is subjected to a rotation out of its position of rest, are measured capacitively, i.e. contact-free. The sensitivity of the sensor can be affected by means of the spatial arrangement of the capacitor arrangement used for signal detection. In this case the construction of the sensor in accordance with micromechanics has a particularly advantageous effect, because with this technology very small distances between the capacitor electrodes are possible.

It is particularly advantageous to suspend the rotor by means of a pivot seating or knife-edge seating. The knife-edge seating represents a particularly low-friction and wear-free seating of the rotor. Producing the sensor of the invention with silicon or at least with a silicon substrate has the advantage that the signal processing electronics can be integrated in the sensor chip. Production in accordance with Liga techniques is advantageous, because it is possible with this technique to produce structures with thicknesses of up to 1000 μm, so that rotors of comparative large seismic mass can be produced. It is advantageous to fill the interior of the sensor completely with a damping medium, the specific weight of which is different from the specific weight of the rotor in such a way that friction in the course of the movement of the rotor in relation to the damping medium results in aperiodic damping of the rotor, so that the appearance of resonance is suppressed.

Exemplary embodiments of the invention are illustrated in the drawings and will be described in detail in the following description.

DRAWINGS

FIG. 1*a* is a section through a sensor in the rotor plane;

FIG. 1*b* is an enlargement of the seating of a rotor,

DETAILED DESCRIPTION OF THE PREFERRED EMBODIMENTS

Figure 1A:
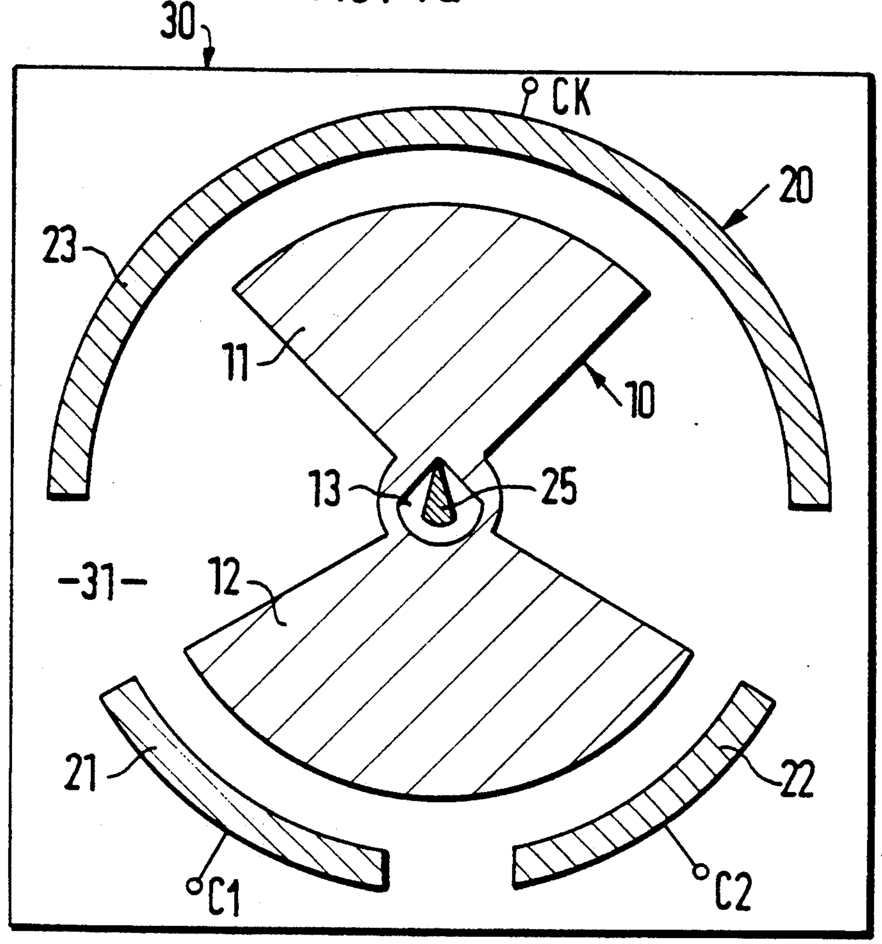

A sensor housing is designated by the reference numeral 30 in FIG. 1*a*. In this case the sensor housing 30 is only shown schematically. All embodiments of a sensor housing having a closed interior fall within the scope of the invention. A substrate is designated in FIG. 1*a* by the reference numeral 31, and may form, for example, a wall of the sensor housing 30 or may be disposed in the interior of the sensor housing and fixedly connected with the sensor housing 30. Applied to the substrate 31 and fixedly connected therewith is a mounting 25, via which a rotor 10 with rotor vanes 11 and 12 is suspended a perforation 13. A base-like border 20, which is segmented into partial borders 21, 22 and 23 surrounds the rotor and is applied to the substrate 31 and fixedly connected with it. In this exemplary embodiment the rotor 10 is formed by a circular disk from which segments have been cut in such a way that the perforation 13 is disposed around the center of the circle and two rotor vanes 11, 12 of different size are formed, so that the rotor is asymmetrical. With an orientation of the rotor shaft perpendicular to the field of gravity, the rotor 10 aligns itself in such a way that its center of gravity is located below the mounting 25. The rotor shaft, which corresponds to the rotational axis of the sensor, is aligned parallel to that axis around which inclinations are intended to be detected. In case of inclinations in the field of gravity, the rotor is given a rotation which, in accordance with the invention, is capacitively detected. The rotor vanes 11 and 12 each are used as one electrode or plate of a capacitor arrangement, the other electrodes or counter-electrodes being formed by the partial borders 21, 22 and 23 of the border 20. It is possible to measure the excursion of the rotor 10 in a contact-free manner. Depending on the material of which the rotor 10 and the border 20 are structured, either the entire structure can be used as electrodes, such as polysilicon structures and metal structures, or only portions of the rotor 10 and of the border 20, for example as in the case of their being made of plastic material where coating of the surfaces used as capacitors is necessary. The interior of the sensor is completely filled with a damping fluid to stop the appearance of resonances and of oscillating movements of the rotor, which would falsify the signal. It is possible to use either a liquid or a gas for damping. It is essential that the specific weight of the damping medium differs from the specific weight of the rotor 10 in such a way that the natural frequency of the pendulum is as low as possible and that friction in the course of a movement of the rotor 10 in relation to the damping medium results in aperiodic damping of the rotor 10. Thus the shape and the specific weight of the rotor, together with the desired damping, determine the choice of a damping medium with suitable viscosity and density. The sensor structure shown in FIG. 1*a* can be produced, for example, with a silicon wafer as the substrate 31 and polysilicon structures applied thereon. This has the advantage that the signal processing electronics of the sensor can be integrated in the micromechanical sensor chip. However, only rotors with a thickness of approximately 2 μm can be produced by means of the polysilicon technology used here. These rotors have only a small seismic mass, which keeps the measuring effect relative low. When producing the sensor structure by means of Liga techniques, the sensor structure can be made of metal, for example nickel, or also of a plastic material, such as resist. This structures can be formed on processed silicon wafers, so that here, too, no additional IC is needed for the signal processing electronics. With the use of this technique it is possible to attain rotor thickness up to 1000 μm. Because of the increased seismic mass of the rotor 10, the measuring effect is greater with such sensors than with sensors produced of polysilicon.

Figure 1B:
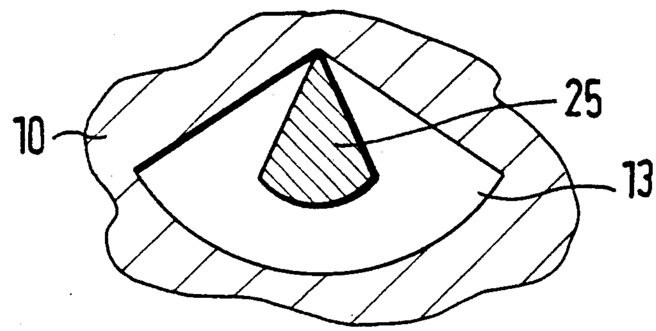

FIG. 1*b* is a portion of FIG. 1*a* and shows the seating of the rotor 10 in an enlargement. In this case the mounting 25 is embodied as a knife-edge; it has a pointed edge. The cross section of the perforation 13 also shows an angle in which the rotor 10 sits on the pointed edge of the mounting 25. This knife-edge seating of the rotor 10 is particularly low in friction and free of wear.

Figure 2:
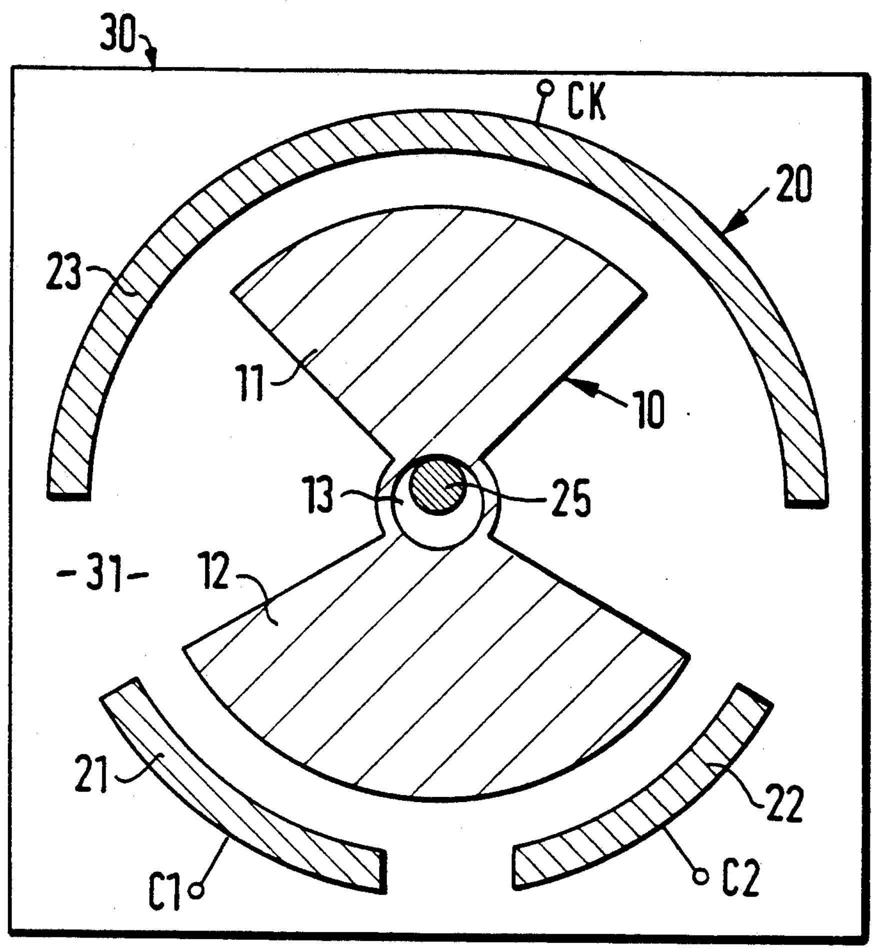
FIG. 2 is a section through a further sensor in the rotor plane.

The sensor structure illustrated in FIG. 2 essentially corresponds to the sensor structure shown in FIG. 1*a*; therefore, like structural elements have been provided with the same reference numerals. The difference between the sensor shown in FIG. 2 and the sensor of FIG. 1*a* lies in the type of seating. In this case, the mounting 25 is formed by a pin with a round cross section. The perforation 13 in the rotor 10 is correspondingly also made round. However, for example the cross sections of the mounting 25 and of the bore 13 may be oval. This pivot seating represents a further possibility for suspending the rotor.

Figure 3:
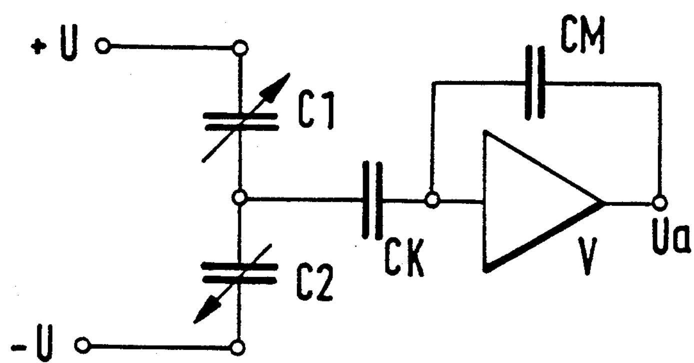
FIG. 3 shows an evaluation circuit.

FIG. 3 shows a simplified wiring of the capacitor arrangement defined by the sensor structures shown in FIGS. 1*a* and 2 in schematic form. The two partial borders 21 and 22, together with the rotor vane 12 form the capacitances C1 and C2. The partial structure 21 is connected to a potential U+ and the partial structure 22 to a potential U−. Together with the partial border 23, the rotor vane 11 forms a capacitor CK. It should be noted that the rotor vanes 11 and 12 are connected to the same potential and as movable parts they are not contacted by the evaluation circuit. Detuning of the capacitor arrangement because of a rotation of the rotor 10 can be measured at the partial border 23 and is conducted via an amplifier V in the evaluation circuit shown in FIG. 3.

Various changes and modifications may be made, and features described in connection with any one of the embodiments may be used with any of the others, within the scope of the inventive concept.

We claim:

1. A sensor, for detecting inclination angles in relation to to a defined rotational axis (25) perpendicular to the direction of the field of gravity, with an interior enclosed by a housing (30), in a center volume of which a mounting (25) is located, which is fixed in relation to the housing, and with a seismic mass, which is suspended form the fixed mounting so that the seismic mass can swing, characterized in that the seismic mass is in the form of a rotor (10) which is asymmetrical with respect to the mounting (25), the rotor (10) can perform excursions around an axis defined by the mounting (25), portions (11, 12) of the rotor (10) constitute electrodes of a capacitor arrangement, a segmented border (20), fixed in relation to the housing (30), is disposed around the rotor (10), and segments (21, 22, 23) of the border (20) define counter-electrodes of the capacitor arrangement and cooperate with said electrode portions (11, 12) of the rotor to detect any rotation of said rotor (10).

2. A sensor in accordance with claim 1, characterized in that the mounting (25) is formed in the shape of a pin which is connected with the housing (25) on at least one end, the rotor (10) has a perforation (13), the cross section of which is larger than the cross section of the pin (25), and the rotor (10) is placed on the pin (25) via the perforation (13).

3. A sensor in accordance with claim 2, characterized in that the pin has a rounded cross section.

4. A sensor in accordance with claim 2, characterized in that the pin (25) has a cross section with at least one acute angle, and the cross section of the perforation (13) has at least one angle, so that the perforation (13), together with the pin (25), forms a knife-edge seating for the rotor (10).

5. A sensor in accordance with claim 2, characterized in that the rotor (10) is formed out of a circular disk for which segments have been cut in such a way that the perforation (13) is disposed near the center of the circle defined by said circular disk and at least one rotor vane is defined on said rotor, so that when said rotor is in a rest position, the center of gravity of the rotor (10) is located below the mounting (25).

6. A sensor in accordance with claim 1, characterized in that the border is arcuate but discontinuous so that arcuate partial borders (21, 22, 23) are formed.

7. A sensor in accordance with claim 1, characterized in that the mounting (25) and the border (20) are placed on a substrate (31) which is fixedly connected with the housing (30).

8. A sensor in accordance with claim 7, characterized in that the substrate (31) is a silicon wafer to which a sequence of thin layers, in particular silicon oxide layers and polysilicon layers, has been applied, and the rotor (10), the mounting (25) and the border (20) are structured out of the sequence of thin layers in accordance with the methods of surface micromechanics and consist at least partially of polysilicon.

9. A sensor in accordance with claim 7, characterized in that the rotor (10), the mounting (25) and the border (20) are structured in accordance with Lithographic/-Galvanoforming (LIGA) techniques from a material selected from the group consisting of metal and plastic.

10. A sensor in accordance with claim 9, characterized in that the rotor (10), the mounting (25) and the border (20) are applied to a silicon substrate.

11. A sensor in accordance with claim 1, characterized in that the interior of the sensor is completely filled with a damping medium.

12. A sensor in accordance with claim 11, characterized in that the specific weight of the rotor (10) differs from the specific weight of the damping medium in such a way that friction in the course of movement of the rotor (10) in relation to the damping medium results in aperiodic damping of the rotor (10).

* * * * *